United States Patent
Geertsema et al.

(10) Patent No.: US 11,286,859 B2
(45) Date of Patent: Mar. 29, 2022

(54) ACOUSTIC PANEL AND METHOD FOR MAKING THE SAME

(71) Applicant: General Electric Company, Schenectady, NY (US)

(72) Inventors: Egbert Geertsema, Cincinnati, OH (US); Kirk Alan Rogers, Chagrin Falls, OH (US)

(73) Assignee: General Electric Company, Schenectady, NY (US)

( * ) Notice: Subject to any disclaimer, the term of this patent is extended or adjusted under 35 U.S.C. 154(b) by 688 days.

(21) Appl. No.: 16/059,326

(22) Filed: Aug. 9, 2018

(65) Prior Publication Data
US 2020/0049074 A1  Feb. 13, 2020

(51) Int. Cl.
| | | |
|---|---|---|
| *F02C 7/24* | (2006.01) | |
| *B33Y 80/00* | (2015.01) | |
| *F02K 1/82* | (2006.01) | |
| *G10K 11/172* | (2006.01) | |
| *E04B 1/84* | (2006.01) | |
| *B32B 3/12* | (2006.01) | |
| *B64D 33/02* | (2006.01) | |
| *B32B 7/12* | (2006.01) | |

(52) U.S. Cl.
CPC ............... *F02C 7/24* (2013.01); *B33Y 80/00* (2014.12); *E04B 1/8409* (2013.01); *F02K 1/827* (2013.01); *G10K 11/172* (2013.01); *B32B 3/12* (2013.01); *B32B 7/12* (2013.01); *B32B 2307/102* (2013.01); *B32B 2605/18* (2013.01); *B64D 2033/0206* (2013.01); *E04B 2001/8438* (2013.01); *F05D 2260/602* (2013.01); *F05D 2260/96* (2013.01)

(58) Field of Classification Search
CPC ......... F02C 7/24; B33Y 80/00; E04B 1/8409; G10K 11/172; B32B 3/12; B32B 7/12; B32B 2307/102; B32B 2605/18; F05D 2260/96
USPC .......................................................... 181/292
See application file for complete search history.

(56) References Cited

U.S. PATENT DOCUMENTS

| | | | |
|---|---|---|---|
| 5,315,820 A * | 5/1994 | Arnold .................... | B32B 3/266 60/226.1 |
| 6,568,135 B1 | 5/2003 | Yokoyama et al. | |
| 6,609,592 B2 | 8/2003 | Wilson | |
| 7,743,884 B2 | 6/2010 | Thomas et al. | |
| 8,439,156 B1 * | 5/2013 | Abram .................... | F01N 13/16 181/237 |
| 8,628,635 B2 | 1/2014 | Chelin et al. | |

(Continued)

FOREIGN PATENT DOCUMENTS

| | | | | |
|---|---|---|---|---|
| FR | 2993609 A1 * | 1/2014 | ................ | F02C 7/06 |
| GB | 1373063 A | 11/1974 | | |

(Continued)

*Primary Examiner* — Forrest M Phillips
(74) *Attorney, Agent, or Firm* — Dority & Manning, P.A.

(57) ABSTRACT

An acoustic panel comprises: a face sheet comprising a plurality of openings; a back sheet opposite to the face sheet; and an intermediate layer comprising a plurality of cells each comprising a cavity and a plurality of walls extending between the face sheet and the back sheet and surrounding the cavity, the plurality of walls comprising a plurality of drainage slots and a plurality of covers covering the plurality of drainage slots and openable for drainage. A method for making the acoustic panel is also described.

20 Claims, 8 Drawing Sheets

(56) References Cited

U.S. PATENT DOCUMENTS

| | | | |
|---|---|---|---|
| 8,636,107 B2 | 1/2014 | Moutier et al. | |
| 8,689,936 B2 | 4/2014 | Richter | |
| 8,951,623 B2 | 2/2015 | Hoetzeldt | |
| 8,979,014 B2 | 3/2015 | Boock et al. | |
| 9,061,769 B2 | 6/2015 | Boulet et al. | |
| 9,273,631 B2 | 3/2016 | Vavalle | |
| 9,290,274 B2 | 3/2016 | Roach et al. | |
| 9,758,057 B2 * | 9/2017 | Jeon | H01M 8/0662 |
| 2002/0036115 A1 * | 3/2002 | Wilson | F02C 7/045 |
| | | | 181/292 |
| 2007/0080020 A1 * | 4/2007 | Emmett | F01N 3/005 |
| | | | 181/237 |
| 2015/0276223 A1 | 10/2015 | Benson et al. | |
| 2017/0089238 A1 * | 3/2017 | Leyko | B33Y 10/00 |
| 2017/0107909 A1 | 4/2017 | Loewenstein et al. | |

FOREIGN PATENT DOCUMENTS

| | | |
|---|---|---|
| GB | 2452476 A | 3/2009 |
| WO | 2015145081 A1 | 10/2015 |

* cited by examiner

ACOUSTIC PANEL AND METHOD FOR MAKING THE SAME

BACKGROUND

The present embodiments generally relate to an acoustic panel and a method for making the acoustic panel. More particularly, the embodiments relate to an acoustic panel useful for acoustic or noise abatement purposes. For example, acoustic or noise abatement purposes include, but are not limited to, turbomachinery, such as but not limited to, an engine and a method for making the acoustic panel.

To prevent damage from, for example, a freeze-thaw cycle, acoustic panels may typically include slots to drain liquid. The liquid can be water and/or fuel, either for use with the device having the panels or from an exterior source from the device. In some instances, about 30% of the area of the acoustic panel can be provided with drainage slots.

However, drainage slots in the acoustic panel may have a negative effect on the desired acoustic or noise attenuation. These slots may reduce the acoustic or noise attenuation when the acoustic panel has a large amount of drainage slots that create "openings" which may not abate acoustics or noises in the device.

In addition, acoustic panel drainage slots may be provided in a default or standard pattern. These default patterns may not be able to support drainage.

SUMMARY OF THE INVENTION

In one aspect, embodiments of the present disclosure relate to an acoustic panel comprising: a face sheet comprising a plurality of openings; a back sheet opposite to the face sheet; and an intermediate layer comprising a plurality of cells each comprising a cavity and a plurality of walls extending between the face sheet and the back sheet and surrounding the cavity, the plurality of walls comprising a plurality of drainage slots and a plurality of covers covering the plurality of drainage slots and openable for drainage.

In another aspect, embodiments of the present disclosure relate to a method for making an acoustic panel, comprising: providing a face sheet comprising a plurality of openings; providing a back sheet opposite to the face sheet; and providing an intermediate layer comprising a plurality of cells each comprising a cavity and a plurality of walls extending between the face sheet and the back sheet and surrounding the cavity, the plurality of walls comprising a plurality of drainage slots and a plurality of covers covering the plurality of drainage slots and openable for drainage.

Optionally, the plurality of walls is provided by additive manufacturing. Optionally, the plurality of covers cover some of the plurality of drainage slots. Optionally, the plurality of covers cover all of the plurality of drainage slots. Optionally, the plurality of covers comprises a door covering a corresponding drainage slot and a hinge connecting the door with a corresponding wall. Optionally, the plurality of covers comprises a baffle covering a corresponding drainage slot and cantilevered from a corresponding wall. Optionally, the plurality of covers comprises a plurality of baffles covering a corresponding drainage slot and cantilevered from corresponding walls. Optionally, the acoustic panel is useful in an engine. Optionally, one of the plurality of cells comprises one or more drainage slots in corresponding walls. Optionally, one of the plurality of cells has a cross-section of a polygon.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
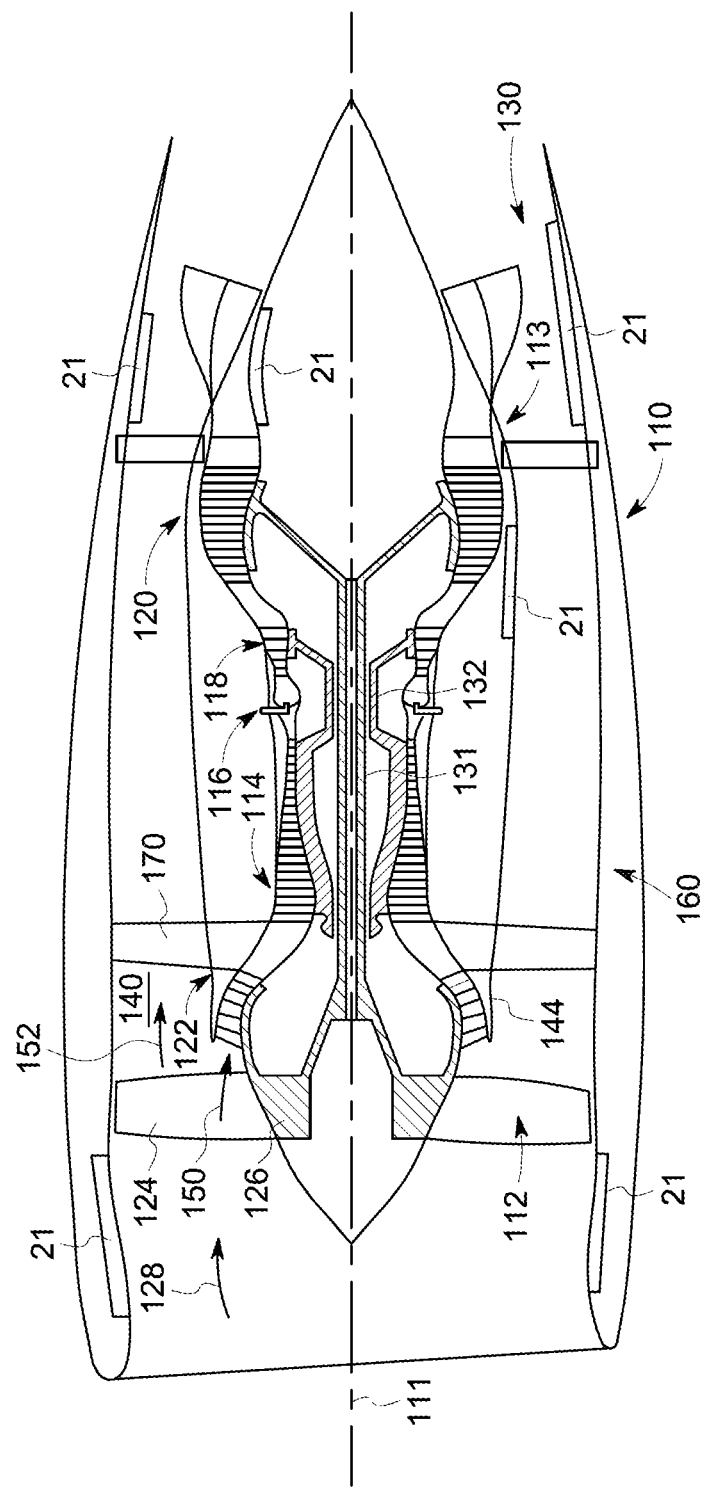
FIG. 1 is a schematic cross-sectional view of an engine in accordance with one exemplary embodiment.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value.

As used herein, the terms "circumferential" and "circumferentially" refer to directions and orientations that extend arcuately about the centerline of the engine.

The term "coupled", or "connected", as used herein, is defined as coupled, or connected, directly or indirectly.

Embodiments herein relate to acoustic panels for acoustic or noise abatement purposes. Acoustic panels find exemplary and non-limiting applications where sound quality improvement and/or abatement are desirable. For example, and in no way limiting of the embodiments, acoustic panels may be used in offices, recording studies, homes, theaters, museums, restaurants, and other facilities where acoustics, noise quality and levels are a concern.

Moreover, and in no way limiting of the embodiments, acoustic panels may be used on or in machines where acoustics and noise abatement are needed or desired. These applications may include but are not limited to, manufacturing machinery, cooling and heating devices, and powerplants including those with turbomachinery, such as gas turbines, steam turbines, generators, and reciprocating engines. Acoustic panels are often useful to manage acoustics and sound quality on turbomachines, such as aero turbomachines and/or aircraft engines.

Moreover, and in no way limiting of the embodiments, acoustic panels may be used on or in machines where acoustics and noise abatement are needed or desired. These applications may include but are not limited to, manufacturing machinery, cooling and heating devices, and powerplants including those with turbomachinery, such as gas turbines, steam turbines, generators, and reciprocating engines. Acoustic panels are often useful to manage acoustics and sound quality on turbomachines, such as aero turbomachines and/or aircraft engines.

Moreover, the acoustic panels described herein comprise slots for drainage of liquid, such as water and/or fuel. The liquid may be present in the panels from openings in a face sheet of the panel. These openings are provided to facilitate drainage of liquid that is used in the operation of the device, or originates outside of the device. Regardless of the source of the liquid in the panel, the slots permit drainage of the liquid therefrom. Additionally, the slots in the acoustic panels can be provided during manufacture of the panels. The manufacturing of the panels and the formation of the slots can be by any suitable process, such as but not limited to, machining, additive manufacturing, 3D printing, forming during the molding or assembly.

In one embodiment, the plurality of walls is for the acoustic panels can be provided during manufacture of the panels, such as by machining, additive manufacturing, 3D printing, forming during the molding or assembly.

The configuration of the acoustic panel herein can facilitate reduction of attenuation therein by reducing the number of slots in the acoustic panel. For example, slots that do not drain liquid can be eliminated. Additionally, the s acoustic panel configuration and the method for making the acoustic panel can increase the attenuation of the acoustic panel, increasing noise margins. Thus, it is possible to achieve desired noise levels with an acoustic panel having a reduced acoustic area and/or length, shorter duct lengths, lighter nacelle, reduced scrubbing drag, and/or lower cost, among other benefits, compared to other panels.

As used herein, the terms "face", "back", "intermediate", "front", "forward", "aft", "upper", "lower", etc., may be used in reference to the perspective of the installation and orientation of the components in the drawings, and therefore are relative terms that indicate the construction, installation and use of the components. However, it is within the scope of the embodiment that the components could be installed and/or used that markedly differs from the components shown in the drawings, or installed at other points of the engine.

The acoustic panel 21, as embodied herein will be described with respect to FIGS. 2 and 3. FIG. 1 illustrates one exemplary and non-limiting application of the acoustic panel as per the embodiments herein, for example and in no way limiting in turbomachine, such as an engine. FIG. 1 application is merely exemplary, and other applications are within the scope of this instant application and claims.

FIG. 1 is a cross-sectional schematic illustration of an exemplary gas turbine engine assembly 110 having a longitudinal axis 111. Gas turbine engine assembly 110 includes a fan assembly 112 and a core gas turbine engine 113. Core gas turbine engine 113 includes a high pressure compressor 114, a combustor 116, and a high pressure turbine 118. In the exemplary embodiment, gas turbine engine assembly 110 also includes a low pressure turbine 120, and a multi-stage booster compressor 122, and a splitter 144 that substantially circumscribes booster 122.

Fan assembly 112 includes an array of fan blades 124 extending radially outward from a rotor disk 126. Gas turbine engine assembly 110 has an intake side 128 and an exhaust side 130. Fan assembly 112, booster 122, and turbine 120 are coupled together by a first rotor shaft 131, and compressor 114 and turbine 118 are coupled together by a second rotor shaft 132.

In operation, air flows through fan assembly 112 and a first portion 150 of the airflow is channeled through booster 122. The compressed air that is discharged from booster 122 is channeled through compressor 114 wherein the airflow is further compressed and delivered to combustor 116. Hot products of combustion (not shown in FIG. 1) from combustor 116 are utilized to drive turbines 118 and 120, and turbine 120 is utilized to drive fan assembly 112 and booster 122 by way of shaft 131. Gas turbine engine assembly 110 is operable at a range of operating conditions between design operating conditions and off-design operating conditions.

A second portion 152 of the airflow discharged from fan assembly 112 is channeled through a bypass duct 140 to bypass a portion of the airflow from fan assembly 112 around the core gas turbine engine 113. More specifically, bypass duct 140 extends between a fan casing 142 and splitter 144. Accordingly, a first portion 150 of the airflow from fan assembly 112 is channeled through booster 122 and then into compressor 114 as described above and a second portion 152 of the airflow from fan assembly 112 is channeled through bypass duct 140 to provide thrust for an aircraft, for example. Gas turbine engine assembly 110 also includes a fan frame assembly 160 to provide structural support for fan assembly 112 and is also utilized to couple fan assembly 112 to core gas turbine engine 113.

Fan frame assembly 160 includes a plurality of outlet guide vanes 170 that typically extend substantially radially, between a radially-outer mounting flange and a radially-inner mounting flange, and are circumferentially-spaced within bypass duct 140. Guide vanes 170 serve to turn the airflow downstream from rotating blades such as fan blades 124.

To reduce noise emanating anywhere in the engine 110, such as but not limited to, in the overall fan frame assembly 160, portions thereof may be lined with noise attenuation panels, which are in the form of an acoustic panel 21, as per the embodiments herein and described with reference to FIGS. 2 and 3. As shown in FIG. 1, the engine 110 may have its fan frame assembly 160 lined with the acoustic panels at but not limited to one or more of regions proximate the fan duct, a thrust reversal unit, the inner wall of the its fan frame assembly 160 and/or the inner fan duct wall.

The acoustic panel 21 can be applied anywhere in the engine where noise attenuation is needed. The acoustic panel 21 can be configured in an arcuate form, for example, having a double curvature configuration. This configuration is embodied in structural parts of the engine 110 illustrated in FIG. 1. In some embodiments, the acoustic panel 21 may be also placed directly on the inner and outer surfaces of the inner and outer walls of the primary nozzle (not illustrated), and/or on the bifurcations (areas where the acoustic panel 21 are located in FIG. 1). The acoustic panel 21 may be a single feature or provided in combination extending circumferentially around the nacelle structure 113.

Figure 2:
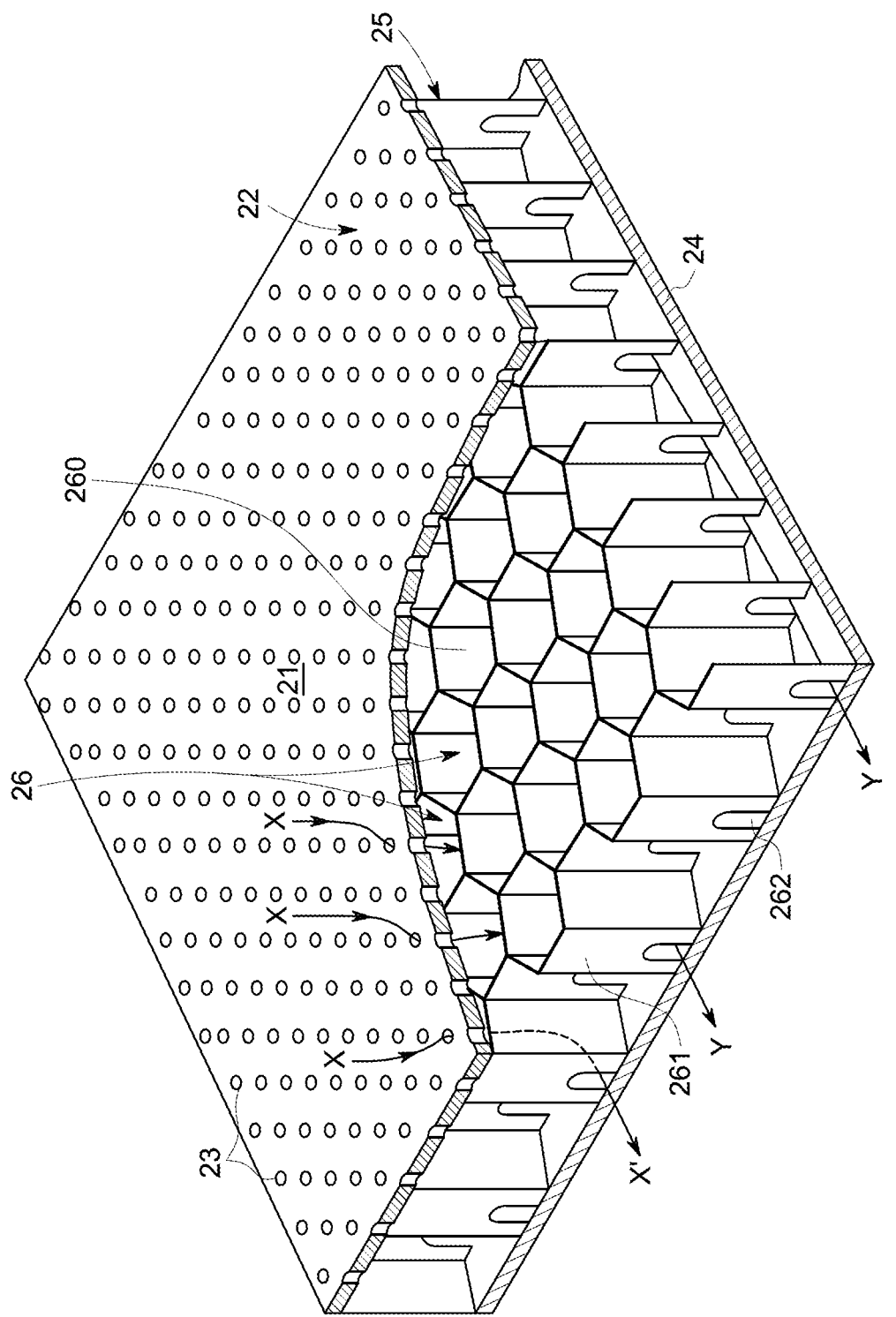
FIG. 2 illustrates a schematic partially cutaway perspective view of an acoustic panel.
Figure 3:
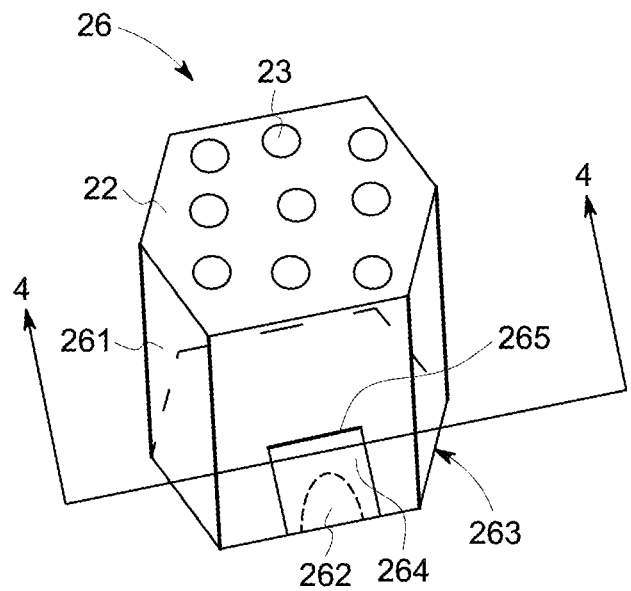
FIG. 3 illustrates a schematic perspective view of a cell of the acoustic panel of FIG. 2 in accordance with an exemplary embodiment.

Referring now to the figures, especially FIGS. 2 and 3 et seq., a noise attenuation or acoustic panel 21 is illustrated. The acoustic panel 21 illustrated comprises a face sheet 22 comprising a plurality of openings 23, a back sheet 24 opposite to the face sheet 22, and a cellular intermediate layer 25 comprising a plurality of cells 26. Each cell 26 comprises a cavity 260 and a plurality of walls 261 extending between the face sheet 22 and the back sheet 24 and surrounding the cavity 260. The plurality of walls 261 can be provided by any appropriate manufacturing process in the formation of the acoustic panel 21. One such non-limiting manufacturing process is additive manufacturing. The plurality of walls comprises a plurality of slots 262, through which liquids can drain, as described hereinafter.

Referring now to FIGS. 2 and 3, a noise attenuation or acoustic panel 21 is illustrated. The acoustic panel 21 illustrated comprises a face sheet 22 comprising a plurality of openings 23, a back sheet 24 opposite to the face sheet 22, and a cellular intermediate layer 25 comprising a plurality of cells 26. Each cell 26 comprises a cavity 260 and a plurality of walls 261 extending between the face sheet 22 and the back sheet 24 and surrounding the cavity 260. The plurality of walls 261 can be provided by any appropriate manufacturing process in the formation of the acoustic panel 21. One such non-limiting manufacturing process is additive manufacturing. The plurality of walls comprises a plurality of slots 262, through which liquids can drain, as described hereinafter.

The plurality of walls also comprises a plurality of covers 263 (illustrated in FIGS. 3-30) covering at least one, a plurality and/or all of the plurality of drainage slots 262. and where the covers 263 are openable through which liquids can drain.

The acoustic panel 21 may be used anywhere that both an acoustic or noise attenuation and liquid drainage are needed. In some embodiments, the acoustic panel 21 may be used in an engine such as an aero or aircraft engine, however, this use is merely exemplary of possible uses of the acoustic panel as per the embodiments herein.

The plurality of openings 23 in the face sheet 23 provide fluid communication between the cells 26 of the cellular intermediate layer 25 and the front face of the face sheet 22. Fluid can pass through one or more of the plurality of openings 23 in the face sheet 22 and enter into the cells 26 of the cellular intermediate layer 25.

The plurality of openings 23 of the face sheet 22 of the acoustic panel 21 have any cross-section (such as the circular cross-section as illustrated in FIG. 2), and can be formed with uniform or non-uniform sizes over the surface of the face sheet 22. Also, the plurality of openings 23 of the face sheet 22 of the acoustic panel 21 can be uniformly or non-uniformly distributed over the surface of the face sheet 22.

To provide for noise attenuation over a wide range of frequencies, the geometry and distribution of one or more of the plurality of openings 23 may be modified. For example, and not limiting of the embodiments, one or more of the plurality of openings 23 may be positioned as an array of openings, and with an opening size and shape that vary over the face sheet 22. An opening size variation may provide differentiated attenuating performance across the acoustic panel 21.

The plurality of openings 23 may be produced by any appropriate manufacturing process. Exemplary and non-limiting processes include at least one of additive manufacturing, 3D printing, mechanical drilling, laser beam drilling, and/or electron beam drilling. The plurality of openings 23 may be produced prior to the face sheet 22, the cellular intermediate layer 25 and the back sheet 24 are joined. However, depending on the manufacturing process, the formation of the plurality of openings may at any appropriate.

The face sheet 22 is coupled to an upper face of the cellular intermediate layer 25. The coupling can be by an adhesive, by the manufacturing processing or other suitable coupling system. The back sheet 24 may be unperforated and made from an impermeable sheet material. The back sheet 24 may also be connected by be by an adhesive, by the manufacturing processing or other suitable coupling system to a lower face of the cellular intermediate layer 25. The cells 26 of the cellular intermediate layer 25 are open-ended and juxtaposed. Also, the plurality of cavities 260 defined thereby may be in fluid communication with the plurality of openings 23, as illustrated in FIG. 2 by arrows X.

In other exemplary non-limiting embodiments, one or more of the plurality of cells 26 may have a polygonal cross-section 264. For example, and not intending to limit the embodiments in any way, one or more of the plurality of cells 26 may have hexagonal cross sections to provide a honeycomb configuration of the intermediate layer 25. Alternatively, the one or more of the plurality of cells 26 may have juxtaposed cells of other polygonal cross-sections other than but including hexagonal (FIGS. 2-7 and 17-22) positioned in the acoustic panel, with cells of different sizes and shapes adjacent each other. For example, one or more of the plurality of cells 26 may be rectangular, one or more of the plurality of cells 26 may be triangular, one or more of the plurality of cells 26 may be hexagonal (FIGS. 2-7 and 17-22), one or more of the plurality of cells 26 may be octagonal, and so forth. In essence, the configuration and polygonal shapes of the one or more of the plurality of cells 26 can take numerous and non-limiting shapes, arrangements, and formations.

In a non-limiting embodiment, the slots 262 in the walls 261 can allow fluids, such as water and/or fuel, to drain from the acoustic panel 21, in the direction of arrows Y. Following the fluid flow, the fluid enters the acoustic panel 21 through the plurality of holes 23 in the face sheet 22, as shown by arrow X. As the fluid enters the intermediate layer 25 it enters one of the plurality of cells 26. From that cell 26 to which the fluid enters, it can then flow through slots 262 as illustrated in FIG. 2. As illustrated, the slots 262 can be arranged flow fluid from one cell 262 to another cell 26, while the flow can continue in the direction of arrows Y to drain the fluid out of the acoustic panel 21.

Some of the cells 26 may comprise only one slot 262 where that cell is proximate a terminus edge of the acoustic panel 21, so as the fluid flow (Arrow X') needs to only flow into one cell 26 to exit a slot 262 to the outside of the acoustic panel 21. Others of the cells 26 may comprise two slots, thus fluid may enter the cell 26 from one slot 262 at one side of the cell 26 and exit the cell 26 from the other side's slot 262. This fluid flow is best illustrated at arrow Y at the right side of the acoustic panel 21 in FIG. 2. Also, as desired and necessitated by the acoustic panel 21 configuration, more than two slots 262 may be provided in a cell 26 depending on the orientation of the acoustic panel 21 and the desired direction of the fluid flow from the acoustic panel 21.

Additionally, in some exemplary embodiments, the acoustic panel 21 comprises covers 263, which cover or block the drainage slots 262. These covers 263, where provided, cover or block the drainage slots 262 due to, for example, pressure equalization and allow gravity assisted drainage, to be described hereinafter. Fluids and/or liquids, such as water and/or fuel or another such liquid, can move or push open the covers 263 with its weight or flow pressure to drain/escape through the drainage slots 262, in essence as a one-way check valving function. In a non-limiting embodiment, the slots 262 in the walls 261 can allow fluids, such as water and/or fuel, to drain from the acoustic panel 21, in the direction of arrows Y. Following the fluid flow, the fluid enters the acoustic panel 21 through the plurality of holes 23 in the face sheet 22, as shown by arrow X. As the fluid enters the intermediate layer 25 it enters one of the plurality of cells 26. From that cell 26 to which the fluid enters, it can then flow through slots 262 as illustrated in FIG. 2. As illustrated, the slots 262 can be arranged flow fluid from one cell 262 to another cell 26, while the flow can continue in the direction of arrows Y to drain the fluid out of the acoustic panel 21.

Some of the cells 26 may comprise only one slot 262 where that cell is proximate a terminus edge of the acoustic panel 21, so as the fluid flow (Arrow X') needs to only flow into one cell 26 to exit a slot 262 to the outside of the acoustic panel 21. Others of the cells 26 may comprise two slots, thus fluid may enter the cell 26 from one slot 262 at one side of the cell 26 and exit the cell 26 from the other side's slot 262. This fluid flow is best illustrated at arrow Y at the right side of the acoustic panel 21 in FIG. 2. Also, as desired and necessitated by the acoustic panel 21 configuration, more than two slots 262 may be provided in a cell 26 depending on the orientation of the acoustic panel 21 and the desired direction of the fluid flow from the acoustic panel 21.

In some embodiments, one of the plurality of cells 26 comprises at least two slots 262 in corresponding walls 261 thereof. In some embodiment, one of the plurality of cells 26 comprises two slots 262 in corresponding walls 261 thereof.

In some embodiments, walls 261 can be provided by an additive manufacturing or 3D printing process. Thus, the drainage slots 262 and the covers 263 are enabled to drain liquid thus providing a lessened negative effect on the acoustic or noise attenuation as a result of the panel 21. Additive manufacturing or 3D printing of the honeycomb cell walls may also permit variation of the covers and the drainage slot configurations to increase the effectiveness of acoustic or noise attenuation.

In the embodiments and configurations herein, the number of covers 263 may be the same as the number of drainage slots 262. Alternatively, the number of covers 263 may be different from the number of drainage slots 262. The number of covers 263 may be dependent on the configuration of the acoustic panel 21, the needed acoustic or noise attenuation, and/or the required liquid drainage amounts and flow rates. In some exemplary embodiments, the number of the covers 263 is less than the number of the drainage slots 262. Moreover, in exemplary and non-limiting embodiments one or more of the plurality of covers 263 can be configured to cover more than one of the plurality of drainage slots 262. In some embodiments, the number of the covers 263 is at least to equal to or greater than the number of the drainage slots 262, whereby and a one-to-one alignment is provided so one of the plurality of covers 263 can cover a respective one of the plurality of drainage slots 262.

The cover 263 may be of any configuration, form and size to cover or block the drainage slots 262 in acoustic or noise attenuation, while allow the liquid drainage through the drainage slots 262 as needed.

Figure 14:
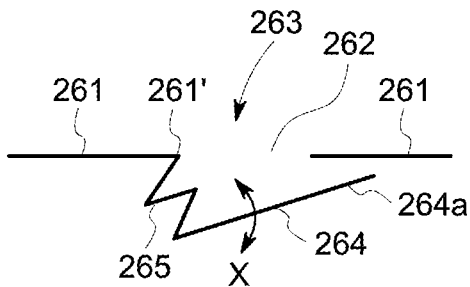
FIG. 14 illustrates schematic partial cross-sectional views of a cell of the acoustic panel of FIG. 2 with different connections of covers with walls in accordance with further exemplary embodiment.
Figure 15:
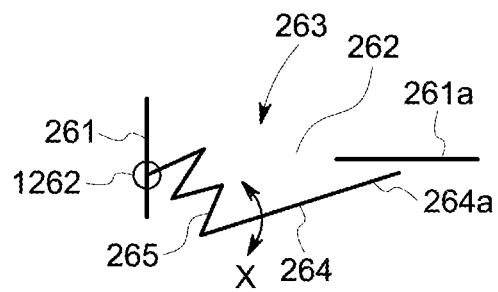
FIG. 15 illustrates schematic partial cross-sectional views of a cell of the acoustic panel of FIG. 2 with different connections of covers with walls in accordance with further exemplary configuration.
Figure 16:
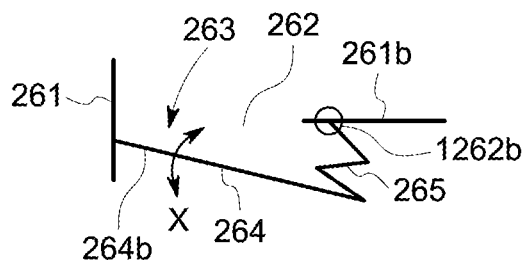
FIG. 16 illustrates schematic partial cross-sectional views of a cell of the acoustic panel of FIG. 2 with different connections of covers with walls in accordance with yet a further exemplary configuration.
Figure 17:
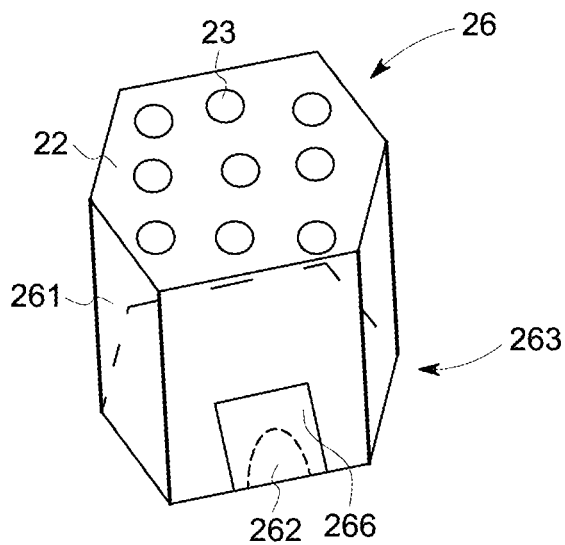
FIG. 17 illustrates a schematic perspective view of a cell of the acoustic panel of FIG. 2 in accordance with a still further exemplary configuration.
Figure 20:
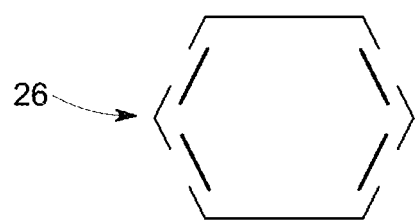
FIG. 20 is a schematic cross-sectional illustration of a cell of the acoustic panel of FIG. 2 with a different cross-section, different arrangement of drainage slots, and/or covers in accordance with still another exemplary configuration.
Figure 18:
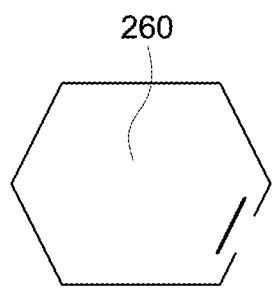
FIG. 18 is a schematic cross-sectional illustration of a cell of the acoustic panel of FIG. 2 with a different cross-section, different arrangements of drainage slots, and/or covers in accordance with another exemplary configuration.
Figure 21:
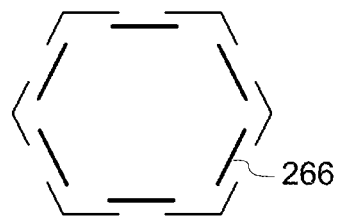
FIG. 21 is a schematic cross-sectional illustration of a cell of the acoustic panel of FIG. 2 with a different cross-section, different arrangement of drainage slots, and/or covers in accordance with another exemplary configuration.
Figure 19:
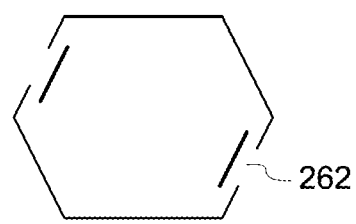
FIG. 19 is a schematic cross-sectional illustration of a cell of the acoustic panel of FIG. 2 with a different cross-section, different arrangement of drainage slots, and/or covers in accordance with another exemplary configuration.
Figure 22:
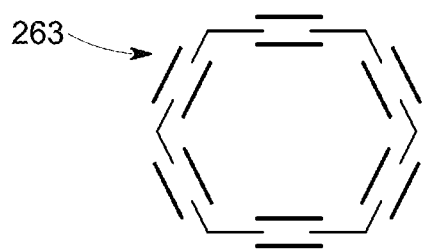
FIG. 22 is a schematic cross-sectional illustration of a cell of the acoustic panel of FIG. 2 with a different cross-section, different arrangements of drainage slots, and/or covers in accordance with a further exemplary configuration.

Referring to FIGS. 3-16, in some embodiments, the cover or plurality of covers 263 comprise a door 264 covering a corresponding drainage slot 262 and a hinge 265 connecting the door 264 with a corresponding wall 261. FIG. 3 is a partially side elevational illustration of a cell 26 having a polygonal configuration, specifically a hexagonal configuration. FIGS. 4-14 illustrate exemplary cross-sectional views of a cell with the cell's slot(s) 262 and associated covers 263. FIGS. 14-16 illustrate configurations of a slot 262 and associated covers 263, doors 264 with various configurations of hinges 265 (described hereinafter).

The cell of FIG. 3 is illustrated with a face plate 22 with multiple holes 23, and while nine (9) holes 23 are illustrated, this configuration and number of holes is merely indicative of the number of holes and configurations of the holes 23 within the scope of the embodiments herein. One wall 262 of the cell 26 is provided with a slot 262. The slot 262 is covered on an exterior portion of the cell 26 and wall 261 by a cover 263 in the form of a door 264. The door 264 is attached to the wall at a hinge 265.

Figure 4:
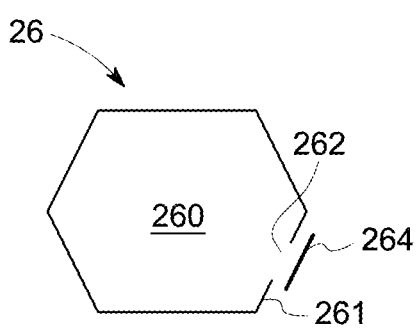
FIG. 4 illustrates a schematic cross-sectional view of a cell of FIG. 2 in the acoustic panel of the embodiments.

FIG. 4 illustrates a cross-sectional view of the cell 26 of FIG. 3 with the door 264 covering the opening 262. As fluid is in the cavity 260 of cell 26, and in FIG. 3, the fluid enters the cavity 260 through holes 23 in the face plate 22, the fluid may exit through the slot having the door 264 open pivoting at the pivot 265. Due to the configuration of the hinge 265 (to be described herein after, the hinge 265 is configured to be a self-closing hinge 265, biased on itself to return and cover the slot 262.

Figure 5:
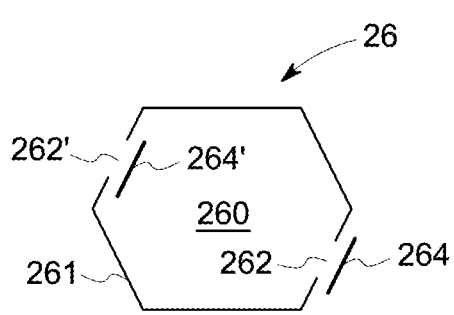
FIG. 5 illustrates a schematic perspective view of a cell of the acoustic panel of a further configuration of the embodiments
Figure 6:
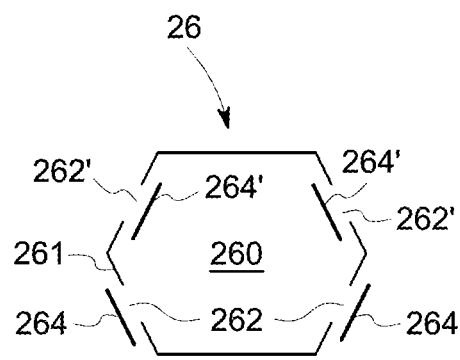
FIG. 6 illustrates a schematic perspective view of a cell of the acoustic panel of another configuration of the embodiments
Figure 7:
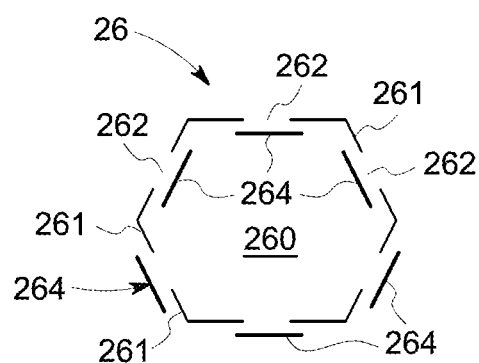
FIG. 7 illustrates a schematic perspective view of a cell of the acoustic panel of an additional configuration of the embodiments

FIGS. 5-7 illustrate various configurations of cells according to embodiments of the application. In FIG. 5, two slots are provided and are covered by respective doors 264. In FIG. 5, fluid can enter the cavity 260 from the holes 23 in the face plate 22, and also through the slot 262' at the upper left of the Figure. Once fluid is in the cavity 260, it can only exit through slot 262 as the door 264' closes the slot 262' and prevents flow back out of the slot 262'. Thus, regardless of how fluid enters the cavity 260, the fluid can only leave the cavity 260 via slot 262.

In FIG. 6, two slots 262' and two slots 262 are provided and are covered by respective doors 264. In FIG. 6, fluid can enter the cavity 260 from the holes 23 in the face plate 22, and also through the slot 262' at the upper left of the Figure. Once fluid is in the cavity 260, it can only exit through slots 262 as the doors close the slots 262' and prevents flow back out of the slots 262'. Thus, regardless of how fluid enters the cavity 260, the fluid can only leave the cavity 260 via slots 262.

In FIG. 7, three slots 262' and two slots 262 are provided and are covered by respective doors 264. In FIG. 6, fluid can enter the cavity 260 from the holes 23 in the face plate 22, and also through the slot 262' at the upper left of the Figure. Once fluid is in the cavity 260, it can only exit through slots 262 as the doors close the slots 262' and prevents flow back out of the slots 262'. Thus, regardless of how fluid enters the cavity 260, the fluid can only leave the cavity 260 via slots 262.

Figure 8:
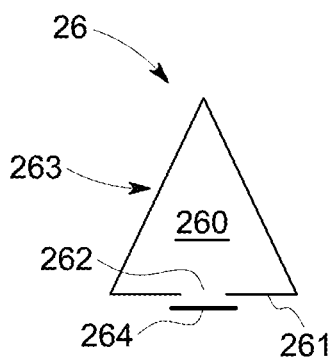
FIG. 8 illustrates a schematic perspective view of a cell of the acoustic panel of a further additional configuration of the embodiments
Figure 9:
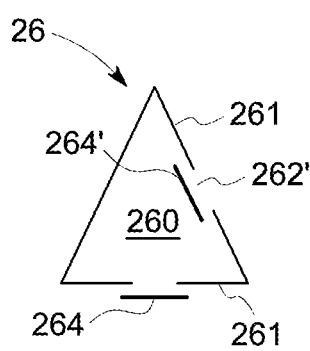
FIG. 9 illustrates a schematic perspective view of a cell of the acoustic panel of yet another configuration of the embodiments
Figure 10:
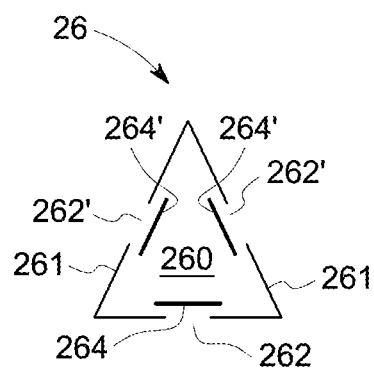
FIG. 10 illustrates a schematic perspective view of a cell of the acoustic panel of another configuration of the embodiments

FIGS. 8-10 illustrate a cross-sectional view of a triangular cell 26. In FIG. 8, one slot is provided in one of the walls 261 and is covered by respective door 264. In FIG. 9, fluid can enter the cavity 260 from the holes 23 in the face plate 22 (as discussed above with respect to FIG. 3), and also through the slot 262' at the upper right of the Figure. Once fluid is in the cavity 260, it can only exit through slot 262 as the door 264' closes the slot 262' and prevents flow back out of the slot 262'. Thus, regardless of how fluid enters the cavity 260, the fluid can only leave the cavity 260 via slot 262.

In FIG. 10, two slots 262' are provided on two axes of the triangular cell 26 and are covered by respective doors 264'. In FIG. 10, fluid can enter the cavity 260 from the holes 23 in the face plate 22, and also through the slot 262'. Once fluid is in the cavity 260, it can only exit through slot 262 as the doors 264' close the slots 262' and prevent flow back out of the slots 262'. Thus, regardless of how fluid enters the cavity 260, the fluid can only leave the cavity 260 via slots 262.

Figure 11:
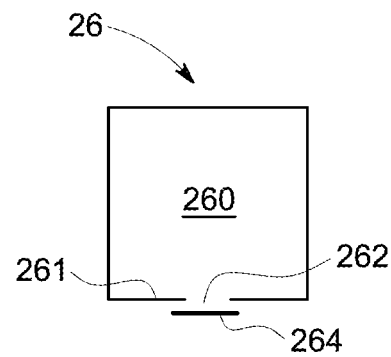
FIG. 11 illustrates a schematic perspective view of a cell of the acoustic panel of a configuration of the embodiments
Figure 12:
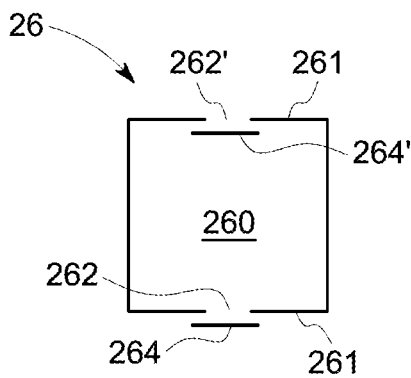
FIG. 12 illustrates a schematic perspective view of a cell of the acoustic panel of yet an additional configuration of the embodiments
Figure 13:
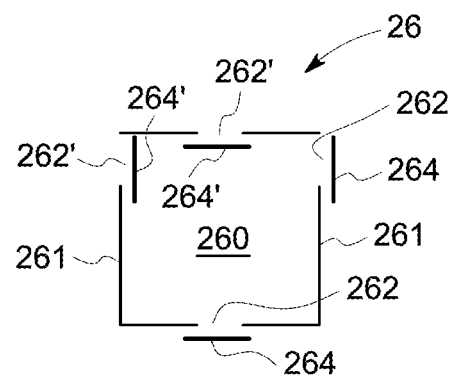
FIG. 13 illustrates a schematic perspective view of a cell of the acoustic panel of still another configuration of the embodiments

FIGS. 11-13 illustrate a cross-sectional view of a rectangular cell 26. In FIG. 11, one slot is provided in one of the walls 261 and is covered by respective door 264. In FIG. 12, fluid can enter the cavity 260 from the holes 23 in the face plate 22 (as discussed above with respect to FIG. 3), and also through the slot 262' at the upper center of the Figure. Once fluid is in the cavity 260, it can only exit through slot 262 as the door 264' closes the slot 262' and prevents flow back out of the slot 262'. Thus, regardless of how fluid enters the cavity 260, the fluid can only leave the cavity 260 via slot 262.

In FIG. 13, two slots 262' and two slots 262' are provided on two axes of the triangular cell 26 and are covered by respective doors 264'. In FIG. 13, fluid can enter the cavity 260 from the holes 23 in the face plate 22, and also through the slot 262'. Once fluid is in the cavity 260, it can only exit through slot 262 as the doors 264' close the slots 262' and prevents flow back out of the slots 262'. Thus, regardless of how fluid enters the cavity 260, the fluid can only leave the cavity 260 via slots 262.

FIGS. 14-16 illustrate schematic partial cross-sectional views of a cell of the acoustic panel with different configurations and connections of covers 263 with walls 261. In these configurations, the hinges 265 and the doors 264 of the covers 263 are connected with the walls 261 in different relative positions in connections. In FIG. 14, the hinge 265 is contiguous with a terminus point 261' of the wall 261, and extends into the cavity 260 of the cell 26, where the cell 26 can take any shape or configuration as envisioned by the instant application. From the hinge 265, the door 264 extends over the slot 262 and has a portion 264a that is self-biased by the hinge 265 in the direction of the arrow X to close the slot by interaction of the portion 264a and the wall 261.

In FIG. 15, the hinge 265 is contiguous with a midpoint 1262 of the wall 261, with the slot 262 formed between that midpoint 1261 and an intersecting wall 261A. Walls 261 and 261A are perpendicular with each other with the slot 262 positioned in the wall 261A leading to where the wall 261A would have perpendicularly intersected wall 261 without the slot 262, so that the slot 262 separates walls 261 and 261A. The hinge 265 is attached to the wall 261 at the midpoint 1261, and extends the door 264 across the slot 262. From the hinge 265, the door 264 extends over the slot 262 and has a portion 264a that is self-biased by the hinge 265 in the direction of the arrow X to close the slot by interaction of the portion 264a and the wall 261.

Again in FIG. 15, the cell 26 can take any shape or configuration as envisioned by the instant application, and the door 264 can open into the cavity 260 of the cell 26 so that fluid can flow into the cavity from an adjacent cavity and then out of the cavity via another door, where the door is as envisioned by any embodiment herein. Alternately, the door 264 can open out of the cavity 260 of the cell 26 so that fluid can flow out the cavity.

In FIG. 16, the hinge 265 is contiguous with the wall 261B. Walls 261 and 261B are perpendicular with each other with the slot 262 positioned in the wall 261B leading to where the wall 261A would have perpendicularly intersected wall 261 without the slot 262, so that the slot 262 separates walls 261 and 261B. The hinge 265 is attached to the wall 261B at point 1262B, and extends the door 264 across the slot 262. From the hinge 265, the door 264 extends over the slot 262 and has a portion 264b that is self-biased by the hinge 265 in the direction of the arrow X to close the slot by interaction of the portion 264b and the wall 261.

Again in FIG. 16, the cell 26 can take any shape or configuration as envisioned by the instant application, and the door 264 can open into the cavity 260 of the cell 26 so that fluid can flow into the cavity from an adjacent cavity and then out of the cavity via another door, where the door is as envisioned by any embodiment herein. Alternately, the door 264 can open out of the cavity 260 of the cell 26 so that fluid can flow out the cavity.

Please refer to FIGS. 17-30, in some embodiments, the plurality of covers 263 comprise a baffle 266 covering a corresponding drainage slot 262 and cantilevered from a corresponding wall 261. In some embodiments, the plurality of covers 263 comprise a plurality of baffles 266 covering a corresponding drainage slot 262 and cantilevered from a corresponding wall 261 or corresponding walls 261.

Figure 23:
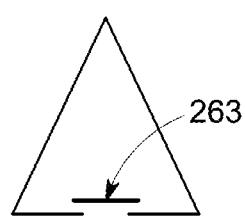
FIG. 23 is a schematic cross-sectional illustration of a cell of the acoustic panel of FIG. 2 with a different cross-section, different arrangements of drainage slots, and/or covers in accordance with still a further exemplary configuration.
Figure 26:
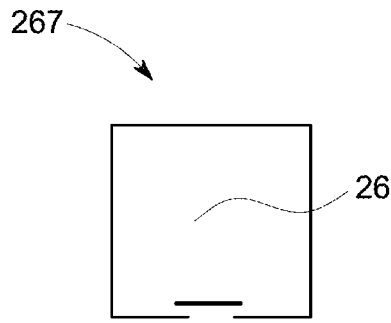
FIG. 26 is a schematic cross-sectional illustration of a cell of the acoustic panel of FIG. 2 with a different cross-section, different arrangements of drainage slots, and/or covers in accordance with yet another exemplary configuration.
Figure 24:
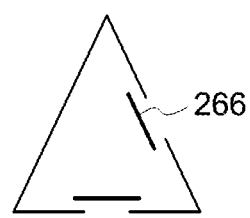
FIG. 24 is a schematic cross-sectional illustration of a cell of the acoustic panel of FIG. 2 with a different cross-section, different arrangements of drainage slots, and/or covers in accordance with another exemplary configuration.
Figure 27:
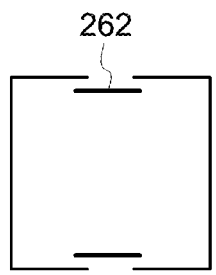
FIG. 27 is a schematic cross-sectional illustration of a cell of the acoustic panel of FIG. 2 with a different cross-section, different arrangements of drainage slots, and/or covers in accordance with an additional exemplary configuration.
Figure 25:
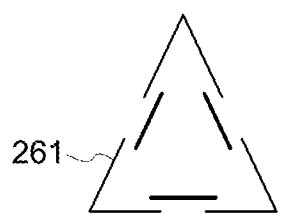
FIG. 25 is a schematic cross-sectional illustration of a cell of the acoustic panel of FIG. 2 with a different cross-section, different arrangement of drainage slots, and/or covers in accordance with another further exemplary configuration.
Figure 28:
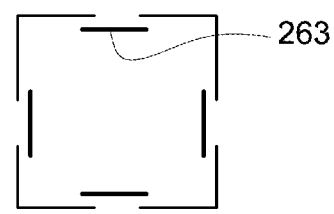
FIG. 28 is a schematic cross-sectional illustration of a cell of the acoustic panel of FIG. 2 with a different cross-section, different arrangements of drainage slots, and/or covers in accordance with still another exemplary configuration.

FIGS. 17-22 show one to twelve covers 263 in the form of baffles 266 corresponding to one to six drainage slots 262 in cells 26 each having a cross section 267 of a hexagon. FIGS. 23-25 illustrate one to three covers 263 in the form of baffles 266 corresponding to one to three drainage slots 262 in cells 26 each having a cross section 267 of a triangle. FIGS. 26-28 illustrate one to four covers 263 in the form of baffles 266 corresponding to one to four drainage slots 262 in cells 26 each having a cross section 267 of a quadrangle.

Figure 29:
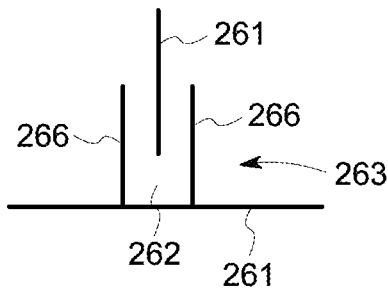
FIG. 29 illustrates a schematic partial cross-sectional view of a cell of the acoustic panel of FIG. 2 with a different connection of covers with walls in accordance with yet one more exemplary configuration.
Figure 30:
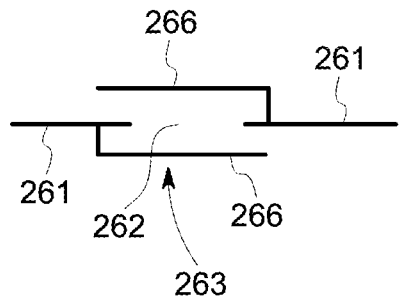
FIG. 30 illustrates a schematic partial cross-sectional view of a cell of the acoustic panel of FIG. 2 with a different connection of covers with walls in accordance with yet a further exemplary configuration.

FIGS. 29 and 30 show schematic partial cross-sectional views of a cell 26 of the acoustic panel 21 of FIG. 2 with different connections of covers 263 with walls 261 in accordance with embodiments of the disclosure. Baffles 266 are positioned with at least one wall 261 positioned intermediate of the baffles, so that any liquid flowing toward a slot 262 will encounter a tortuous path from the interior of a cavity out around the baffles 266 and out of the slot 262. In FIG. 29 the baffles 266 are perpendicular with the wall 261 and parallel to another wall 261 so fluid flows over a baffle 266 into slot 262 and under a wall 261 and then over a second baffle 266 to flow out of the cover 263.

In FIG. 30, the baffles 266 are parallel to walls 261 after extending for a leg portion attached the respective walls 261 and then turning at a right angel to be parallel with the walls 261. Therefore, fluid flows under a baffle 266, into slot 262 and around the other baffle 266 and out of the cover 263

Figure 31:
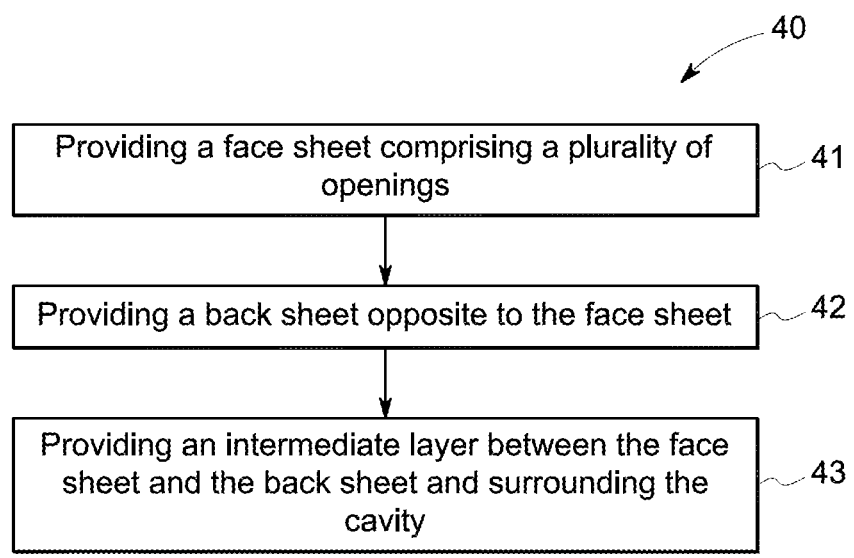
FIG. 31 is a schematic flow chart of an exemplary method for making an acoustic panel in accordance.

Referring to FIG. 31, embodiments of the present embodiment relate to a method 40 for making an acoustic panel 21, comprising: Step 41, providing/forming a face sheet comprising a plurality of openings; Step 42, providing/forming a back sheet opposite to the face sheet; and Step 43, providing/forming an intermediate layer comprising a plurality of cells each comprising a cavity and a plurality of walls extending between the face sheet and the back sheet and surrounding the cavity, the plurality of walls comprising a plurality of slots for drainage. In Step 44 the face sheet, the back sheet and the intermediate layer are joined to form the acoustic panel 21. Alternately, Steps 41, 42 and 43 may be simultaneously provided/formed in a contemporaneous timing to form the acoustic panel 21, such as but not limited to forming the acoustic panel 21 by molding, 3D printing, additive manufacturing and the like.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An acoustic panel comprising:
   a face sheet comprising a plurality of openings;
   a back sheet opposite to the face sheet; and
   an intermediate layer comprising a plurality of cells, each of the plurality of cells defining a cavity and a plurality of walls extending between the face sheet and the back sheet and surrounding the cavity, the plurality of walls comprising a plurality of drainage slots and a plurality of covers covering the plurality of drainage slots and the plurality of covers openable via a weight of a liquid or pressure equalization for drainage of the cavity, wherein at least one of the plurality of covers is arranged such that liquid drains from one cell to another cell.

2. The acoustic panel of claim 1, wherein the plurality of walls is formed by additive manufacturing.

3. The acoustic panel of claim 1, wherein the plurality of covers cover some of the plurality of drainage slots.

4. The acoustic panel of claim 1, wherein the plurality of covers cover all of the plurality of drainage slots.

5. The acoustic panel of claim 1, wherein the plurality of covers comprises a door covering a corresponding drainage slot and a hinge connecting the door with a corresponding wall.

6. The acoustic panel of claim 1, wherein the plurality of covers comprise a baffle covering a corresponding drainage slot and cantilevered from a corresponding wall.

7. The acoustic panel of claim 1, wherein the plurality of covers comprises a plurality of baffles, at least one of the plurality of baffles covering a corresponding drainage slot and cantilevered from one or more corresponding walls.

8. The acoustic panel of claim 1, wherein one of the plurality of cells has a cross-section of a polygon.

9. A method for making an acoustic panel, comprising:
   providing a face sheet comprising a plurality of openings;
   providing a back sheet opposite to the face sheet; and
   providing an intermediate layer comprising a plurality of cells each comprising a cavity and a plurality of walls extending between the face sheet and the back sheet and surrounding the cavity, the plurality of walls comprising a plurality of drainage slots and a plurality of covers covering the plurality of drainage slots, the plurality of covers openable via a weight of a liquid or pressure equalization for drainage of the cavity, wherein at least one of the plurality of covers is arranged such that liquid drains from one cell to another cell.

10. The method of claim 9, wherein the plurality of walls is formed by additive manufacturing.

11. The method of claim 9, wherein the plurality of covers cover some of the plurality of drainage slots.

12. The method of claim 9, wherein the plurality of covers cover all of the plurality of drainage slots.

13. The method of claim 9, wherein the plurality of covers comprises a door covering a corresponding drainage slot and a hinge connecting the door with a corresponding wall.

14. The method of claim 9, wherein the plurality of covers comprises a baffle covering a corresponding drainage slot and cantilevered from a corresponding wall.

15. The method of claim 9, wherein the plurality of covers comprises a plurality of baffles, at least one of the plurality of baffles covering a corresponding drainage slot and cantilevered from a corresponding wall or corresponding walls.

16. The method of claim 9, wherein the acoustic panel is useful in an engine.

17. The method of claim 9, wherein one of the plurality of cells comprises one or more drainage slots in corresponding walls thereof.

18. The method of claim 11, wherein one of the plurality of cells has a polygonal cross-section.

19. The method of claim 9, wherein one of the plurality of cells has a polygonal cross-section and wherein one of the plurality of cells comprises one or more drainage slots in corresponding walls thereof.

20. The method of claim 9, wherein the plurality of covers comprises a plurality of baffles, at least one of the plurality of baffles covering a corresponding drainage slot and cantilevered from a corresponding wall or corresponding walls; and wherein one of the plurality of cells has a polygonal cross-section.

* * * * *